(12) United States Patent
Wänstedt et al.

(10) Patent No.: US 9,332,134 B2
(45) Date of Patent: May 3, 2016

(54) CHARGING OF BATTERY-OPERATED DEVICES OVER WIRELESS CONNECTIONS

(75) Inventors: Stefan Wänstedt, Luleå (SE); Jan Christoffersson, Luleå (SE); Sara Landström, Luleå (SE); Min Wang, Luleå (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 6 days.

(21) Appl. No.: 14/240,051

(22) PCT Filed: Aug. 25, 2011

(86) PCT No.: PCT/SE2011/051021
§ 371 (c)(1),
(2), (4) Date: Feb. 21, 2014

(87) PCT Pub. No.: WO2013/028111
PCT Pub. Date: Feb. 28, 2013

(65) Prior Publication Data
US 2014/0194092 A1    Jul. 10, 2014

(51) Int. Cl.
*H04W 4/24* (2009.01)
*H04M 17/00* (2006.01)
(Continued)

(52) U.S. Cl.
CPC .............. *H04M 15/61* (2013.01); *G06Q 50/10* (2013.01); *H02J 7/0004* (2013.01); *H02J 7/025* (2013.01);
(Continued)

(58) Field of Classification Search
CPC .............. H04W 4/24; H04M 2215/32; H04M 2215/2026; H04M 17/00; H04M 15/00; H02J 5/005; H02J 7/0052; H02J 2007/0001

USPC ......................................... 320/108, 109, 114
See application file for complete search history.

(56) References Cited

U.S. PATENT DOCUMENTS

2002/0153862 A1 * 10/2002 Kuroki .................. H02J 7/0027
320/114
2008/0208976 A1    8/2008 Chapalamadugu et al.
(Continued)

FOREIGN PATENT DOCUMENTS

| CN | 201 117 762 | 9/2008 |
|---|---|---|
| KR | 2010 0059641 A | 6/2010 |
| WO | WO 2011/112009 | 9/2011 |

OTHER PUBLICATIONS

International Search Report for International Application No. PCT/SE2011/051021, May 16, 2012.
(Continued)

*Primary Examiner* — Sharad Rampuria
*Assistant Examiner* — Obidon Bassinan
(74) *Attorney, Agent, or Firm* — Patents on Demand, P.A.; Brian K. Buchheit; Scott M. Garrett

(57) ABSTRACT

The technology described herein provides wireless charging for battery-operated electronic devices (14) including both mobile and fixed battery-operated devices. A wireless charging system, based on any suitable wireless charging technology(ies), allows easy access/discovery, registration, authorization, monitoring, and/or compensation for charging services. The technology uses donor mobile radio nodes (12) that register as potential charging stations for requesting radio nodes (14). The donor and requesting nodes negotiate the charging event, and in a preferred example embodiment, payment by the requester for the charging service to donor is arranged.

24 Claims, 5 Drawing Sheets

(51) Int. Cl.
*H04M 15/00* (2006.01)
*G06Q 50/10* (2012.01)
*H02J 7/02* (2016.01)
*H02J 7/00* (2006.01)
*H04W 12/06* (2009.01)

(52) U.S. Cl.
CPC .............. *H04M 15/00* (2013.01); *H04M 15/68* (2013.01); *H04W 4/24* (2013.01); *H04W 12/06* (2013.01); *H04M 2215/0196* (2013.01)

(56) References Cited

U.S. PATENT DOCUMENTS

| | | | |
|---|---|---|---|
| 2011/0115433 A1 | 5/2011 | Lee et al. | |
| 2011/0221391 A1* | 9/2011 | Won | H01M 10/44 320/108 |
| 2011/0225073 A1* | 9/2011 | Won | G06Q 30/06 705/30 |
| 2012/0098485 A1* | 4/2012 | Kang | H02J 7/025 320/108 |
| 2012/0164943 A1* | 6/2012 | Bennett | G06Q 20/3674 455/41.1 |

OTHER PUBLICATIONS

PCT International Preliminary Report on Patentability for International Application No. PCT/SE2011/051021, Feb. 25, 2014.

"Fujitsu Develops Technology for Design of Compact, High-Efficiency Wireless Charging Systems" Fujitsu Laboratories Ltd., Sep. 13, 2010.

Powermat Wireless Charging System for iPhone 4 Review & Rating; pcmag.com, Nov. 18, 2010.

* cited by examiner

CHARGING OF BATTERY-OPERATED DEVICES OVER WIRELESS CONNECTIONS

PRIORITY

This nonprovisional application is a U.S. National Stage Filing under 35 U.S.C. §371 of International Patent Application Serial No. PCT/SE2011/051021, filed Aug. 25, 2011 and entitled "Charging of Battery-Operated Devices Over Wireless Connections."

TECHNICAL OVERVIEW

The technology relates to wireless charging of battery-operated devices.

INTRODUCTION

Mobile radio devices are ubiquitous and more powerful than ever before. People can readily program and install new applications to their smart-phones according to their preferences. But many features like a larger display screen, larger memory, and more powerful processing consume considerable battery power. As a result, more frequent charging may be required.

Charging must be performed at stationary, dedicated charging locations, e.g., an AC power outlet, where users must bring a charge cable with them. Such outlets may not be available in many places. Users often can not keep track of or predict when and where power charging is needed for their mobile devices.

In light of these and other factors, the inventors envision wireless charging as an increasing desirable option for battery-operated electronic devices, especially battery-operated mobile devices. What is needed is a wireless charging system based on one or more wireless charging technologies that is flexible, convenient, and allows easy access/discovery, registration, authorization, monitoring, and/or compensation for charging services.

SUMMARY

The technology described herein provides wireless charging for battery-operated electronic devices including both mobile and fixed battery-operated devices. A wireless charging system, based on any suitable wireless charging technology(ies) allows easy access/discovery, registration, authorization, monitoring, and/or compensation for charging services. The technology uses donor mobile radio nodes that register as potential charging stations for requesting radio nodes. The donor and requesting nodes negotiate the charging event, and in a preferred example embodiment, payment by the requester for the charging service to donor is arranged.

One aspect of a wireless charging method and system includes a radio node receiving a request from a requesting battery-operated radio equipment for wireless charging. After the request is authorized, the radio node arranges wireless charging for the requesting battery-operated radio equipment by one or more donor mobile radio nodes. In one example embodiment, the authorizing includes reserving payment from or on behalf of the requesting battery-operated radio equipment for the wireless charging. After the wireless charging is provided by the one or more donor mobile radio nodes, payment is initiated to or for the benefit of the one or more donor mobile radio nodes for the provided wireless charging.

In an example embodiment, requests from multiple donor mobile radio nodes are received indicating an ability to provide wireless charging for battery-operated radio equipment. The multiple donor mobile radio nodes are preferably registered in some fashion, and one of multiple candidate donor mobile radio nodes is selected to provide the requested wireless charging, and the requesting battery-operated radio equipment is informed of the selected donor mobile radio node.

In one example implementation, a radio node is a base station. In another example implementation, the radio node is a mobile station.

Another aspect of a wireless charging method and system includes a donor mobile radio (e.g., a user equipment (UE)) indicating availability to provide a battery charging service. A charging request associated with a requesting battery-operated radio equipment is detected, and in response to the charging request, the donor mobile radio provides wireless charging to the requesting battery-operated radio equipment. Any suitable wireless charging technology may be used such as but not limited to induction-based wireless charging technology, magnetic resonance-based wireless charging technology, radio wave-based wireless charging technology, etc. After providing the wireless charging to the requesting battery-operated radio equipment, the radio node may determine a remaining amount of power available for a future charging request.

In an example implementation, a registration message is sent to a base station to indicate availability to provide the battery charging service. The registration message includes a charging amount or volume that the donor mobile radio can supply for the battery charging service. In this situation, the donor mobile radio detects the charging request from a base station. Thereafter, the donor mobile radio may be sent charging requests from a base station.

In an alternative example implementation, the donor mobile radio detects the charging request directly from the requesting battery-operated radio equipment. The donor mobile radio may reserve payment from or on behalf of the requesting battery-operated radio equipment for the wireless charging.

Another aspect of a wireless charging method and system includes a battery-operated radio equipment transmitting a radio message requesting wireless charging of its battery. In one non-limiting example, the battery-operated radio equipment broadcasts the radio message requesting wireless charging of its battery for receipt by one or more donor mobile radio nodes. In another example, the battery-operated radio equipment transmits the radio message requesting wireless charging of its battery to one or more base stations for subsequent transmission to one or more donor mobile radio nodes. Preferably, the radio equipment receives a response to its request with an authorization associated with provision of the wireless charging. Ultimately, a wireless charging signal is received from a donor mobile radio node which is used to charge the battery. The authorization may include providing for payment for the requested wireless charging on behalf of the donor mobile radio.

DETAILED DESCRIPTION

Figure 1:
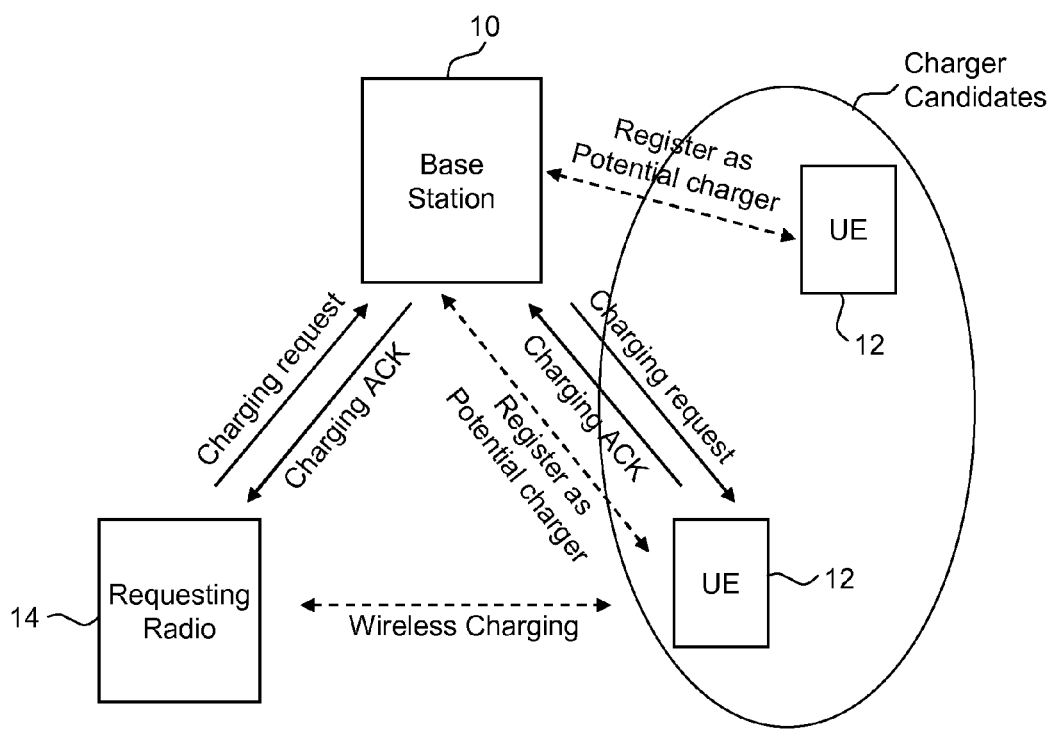
FIG. 1 is function block diagram illustrating a first non-limiting example embodiment for wireless charging.

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not obscure the description with unnecessary detail. Individual blocks are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Nodes that communicate using the air interface also have suitable radio communications circuitry. Software program instructions and data may be stored on a non-transitory, computer-readable storage medium, and when the instructions are executed by a computer or other suitable processor control, the computer or processor performs the functions associated with those instructions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

A wireless charging service is provided by one or more "donor" mobile radio devices to one or more "requesting" battery-operated devices whose battery needs charging. In an example embodiment where both the donor and requesting devices are user equipments (UEs) such as smartphones, PDAs, laptops, cell phones, etc., each device may function as both the wireless power charger/donor as well as the power receiver. Any suitable payment model may be used where the UE/subscriber receiving the wireless charging service makes payments directly or indirectly to the donor UE/subscriber. Various methods are described for registering as a potential wireless charging donor, discovering potential wireless charging donors, and negotiation for the wireless charging service.

FIG. 1 is function block diagram illustrating a first non-limiting example embodiment for wireless charging. A radio base station 10 communicates with multiple radio user equipments (UEs) over the radio interface, some of which are potential donor wireless charging UEs 12 referred to in the oval as charger candidates. These UEs preferably register with the base station 10 as a potential charger using any suitable method such as dedicated or broadcast signaling that may be separate from or included in existing signaling that the UEs already transmit. The base station 10 also communicates with a requesting radio 14 over the radio interface. The requesting radio can be a mobile device or a stationary device. Both the UEs and the requesting radio 14 are battery-operated devices and include some sort of wireless charging circuitry. The donor UEs 12 include wireless charging circuitry that allows them to charge the battery of a requesting radio 14, and the requesting radio 14 includes wireless charging circuitry that allows a wireless charging signal from a donor UE to be used to charge the battery of the requesting radio 14.

Any suitable wireless charging technology may be used. Two non-limiting examples include induction-based wireless charging (see, e.g., USPA 2011/0115433 incorporated herein by reference) and resonance-based wireless charging (see, e.g., USPA 2011/0115433 incorporated herein by reference). Other further examples include radio-based near-field or far field wireless charging, optically-based wireless charging, solar-based wireless charging, etc. The wireless charging power is transmitted between a donor and receiver without the use of physical conductors.

The registration signaling between the base station and a UE charger candidate may include one or more charging-capability parameters. One example parameter is simply a charger option parameter to indicate whether the UE is a donor charger or not. Another example parameter may be a charging volume or capacity, i.e., an amount of energy (mAh) that can be provided to charge other devices.

In a preferred example embodiment, after the requesting radio 14 makes a charging request but before charging starts, the eNB reserves payment from the requesting radio 14 either directly or after contacting a subscriber database, e.g., an HLR, to determine whether the requesting radio may receive the wireless charging service. After the charging is complete, the payment is given to the donor UE 12 which supplies the power to the requesting radio 14.

Consider this likely example charging situation illustrated in FIG. 1. Assume a requesting radio 14 is running low on battery power. The requesting radio 14 applies for a wireless charging service using the following example procedure. First, the requesting radio 14 sends a charging request to the eNB, which may include a list of possible donor UEs power whose presence the requesting radio is aware of either by detecting them directly or being notified of them by the eNB. The possible donor UEs may be ranked in the order of the signal strength by UE through short range communication technology, for example, Bluetooth, or WiFi, etc. Another option is to identify and choose possible donor UEs from historic statistics. Ideally, the proposed donor UEs are physically proximate to the requesting radio. Second, upon receiving the charging request from the requesting radio, the eNB negotiates with one or more registered donor UEs, and selects an available one. Third, the eNB provides the identity of the selected donor UE to the requesting radio, and wireless charging is performed between the selected donor UE and the requesting radio.

Figure 2:
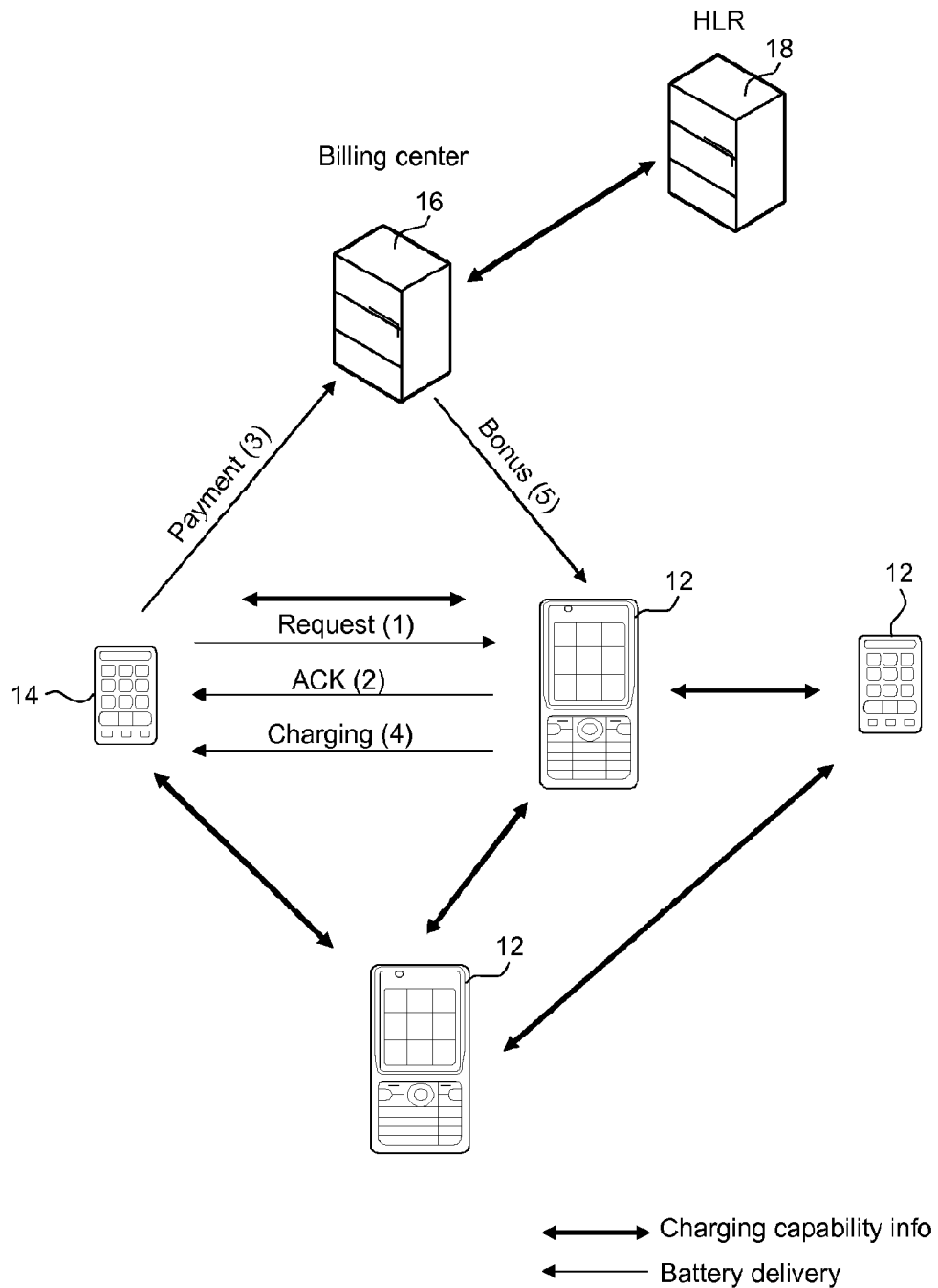
FIG. 2 is function block diagram illustrating a second non-limiting example embodiment for wireless charging.

FIG. 2 is function block diagram illustrating a second non-limiting example embodiment for wireless charging. Charging capability signaling is indicated with thicker black lines, and wireless charging power delivery is indicated with a thinner black line. Three donor UEs 12 are illustrated which can work as charging UEs. They are shown communicating with each other information regarding their availability to perform wireless charging service. No base station node needs to be involved in the substantive communication, although the UEs 12 may communicate their availability either directly over the radio interface to the other UEs 12, e.g., via a wireless technology like WiFi, Zigbee, Bluetooth, etc., or via a base station, repeater, or relay node. UEs 12 may broadcast charging-capability information as described in the first embodiment that includes one or more parameters like a charger option parameter and/or a charging volume, i.e., amount of energy (mAh) that can be provided to a requesting radio device. The requesting radio 14 detects the presence of two of the donor UEs 12 by reading broadcast information. The possible donor UEs 12 may be ranked in the order of received signal strength and the one with the strongest received signal strength may be selected by the requesting radio 14. The requesting radio 14 makes a wireless charging request to one of them, after which a negotiation process begins. The requested donor UE 12 acknowledges the wireless charging request. Before charging starts, payment from the requesting radio is preferably reserved at a billing center (via a radio access network not shown). This payment reservation may require contact of an HLR 18 for accessing a subscriber database to determine whether the requesting radio may receive the wireless charging service. After authorization (if desired) and payment reservation, the donor UE 12 performs wireless charging of the requesting radio 14. When the charging is complete, payment (labeled a bonus in FIG. 2) for the charging service is provided by the billing center 16 to the donor UE 12 directly or to an account associated with the donor 12. After providing the wireless charging to the requesting battery-operated radio equipment, the donor radio node may also determine a remaining amount of power available for a future charging request.

Figure 3:
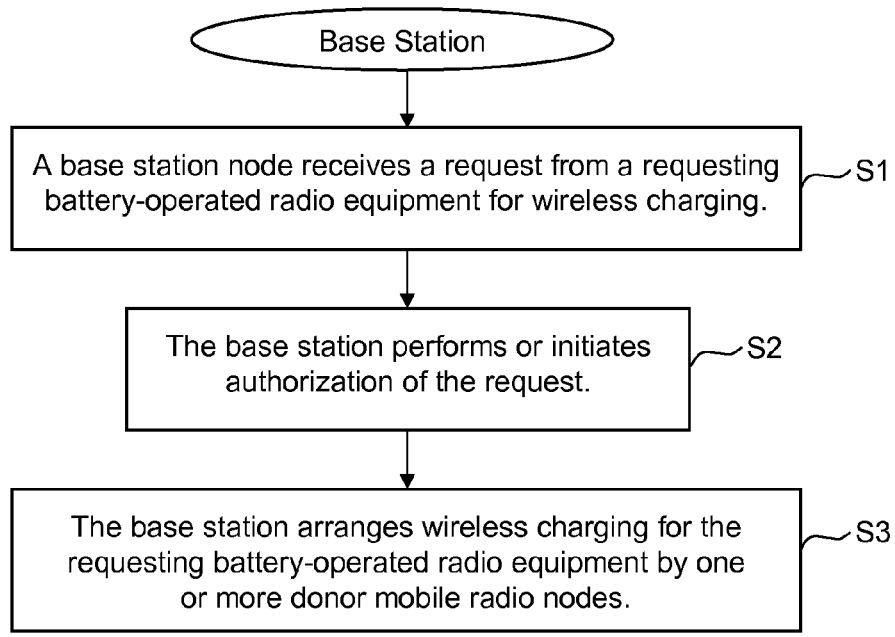
FIG. 3 is a flowchart illustrating non-limiting example procedures for a base station involved setting up wireless charging service in accordance with the first embodiment.

FIG. 3 is a flowchart illustrating non-limiting example procedures for a base station involved in setting up wireless charging service in accordance with the first embodiment. A base station node receives a request from a requesting battery-operated radio equipment for wireless charging (step S1). The base station performs or initiates authorization of the request (step S2). The base station arranges wireless charging for the requesting battery-operated radio equipment by one or more donor mobile radio nodes (step S3).

Figure 4:
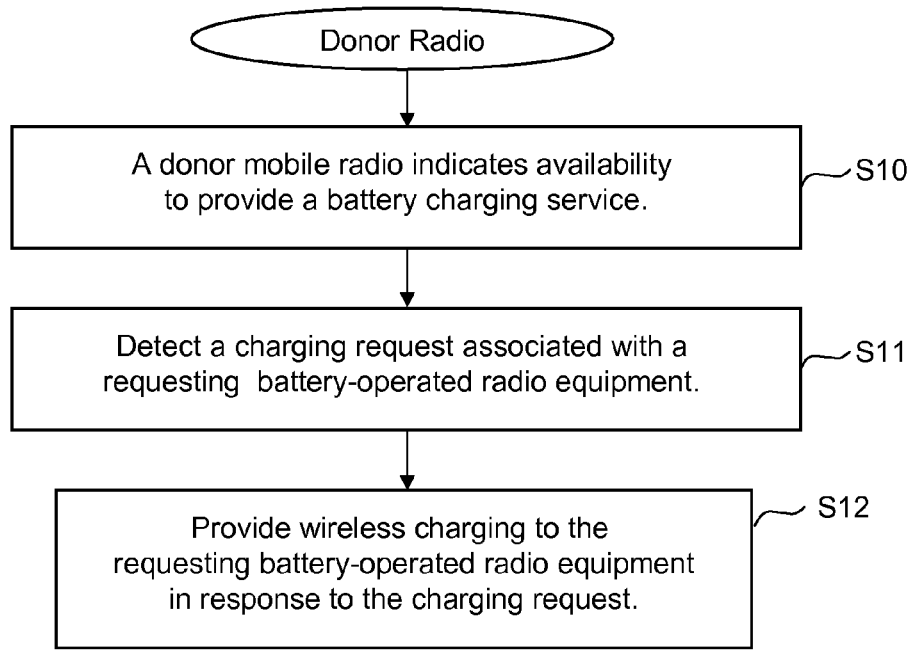
FIG. 4 is a flowchart illustrating non-limiting example procedures for a donor radio providing wireless charging service.

FIG. 4 is a flowchart illustrating non-limiting example procedures for a donor UE providing wireless charging service. A donor mobile radio indicates availability to provide a battery charging service (step S10). The donor UE detects a charging request associated with a requesting battery-operated radio equipment (step S11). The donor UE then provides wireless charging to the requesting battery-operated radio equipment in response to the charging request (step S12).

Figure 5:
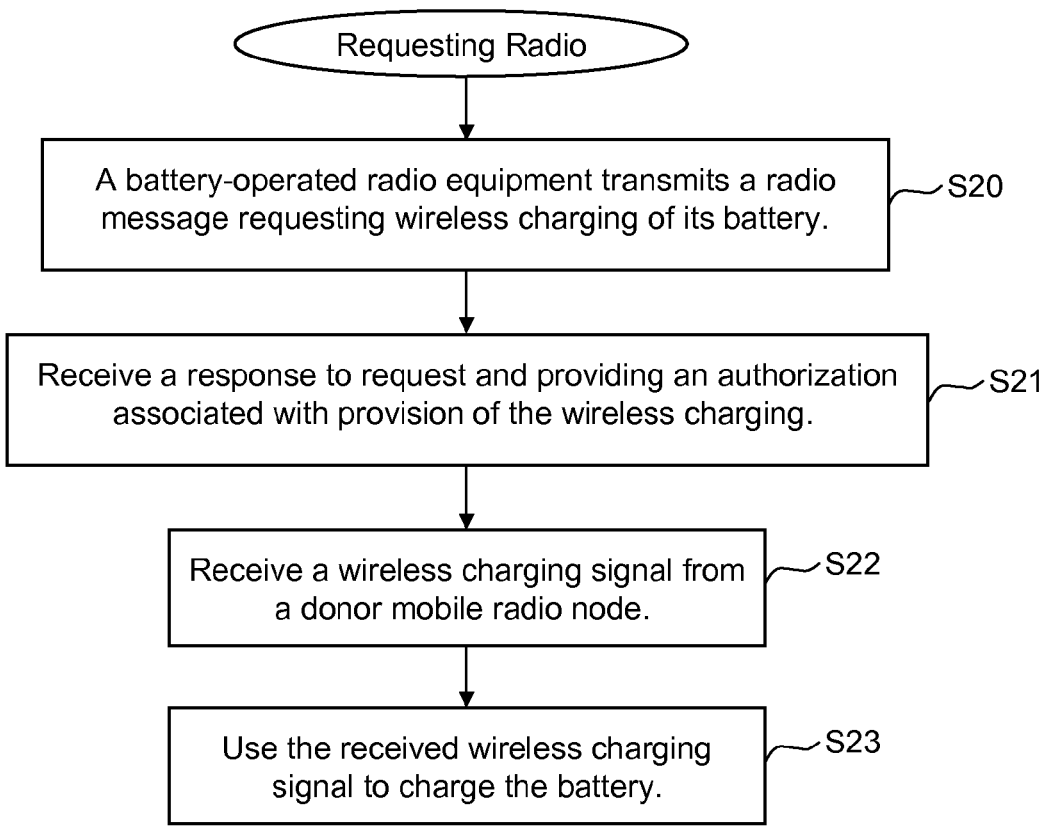
FIG. 5 is a flowchart illustrating non-limiting example procedures for a requesting radio desiring wireless charging service.

FIG. 5 is a flowchart illustrating non-limiting example procedures for a requesting radio desiring wireless charging service. A battery-operated radio equipment transmits a radio message requesting wireless charging of its battery (step S20). The requesting radio receives a response to request and provides an authorization associated with provision of the wireless charging (step S21), and receives a wireless charging signal from a donor mobile radio node (step S22). The requesting radio uses the received wireless charging signal to charge the battery (step S23).

Figure 6:
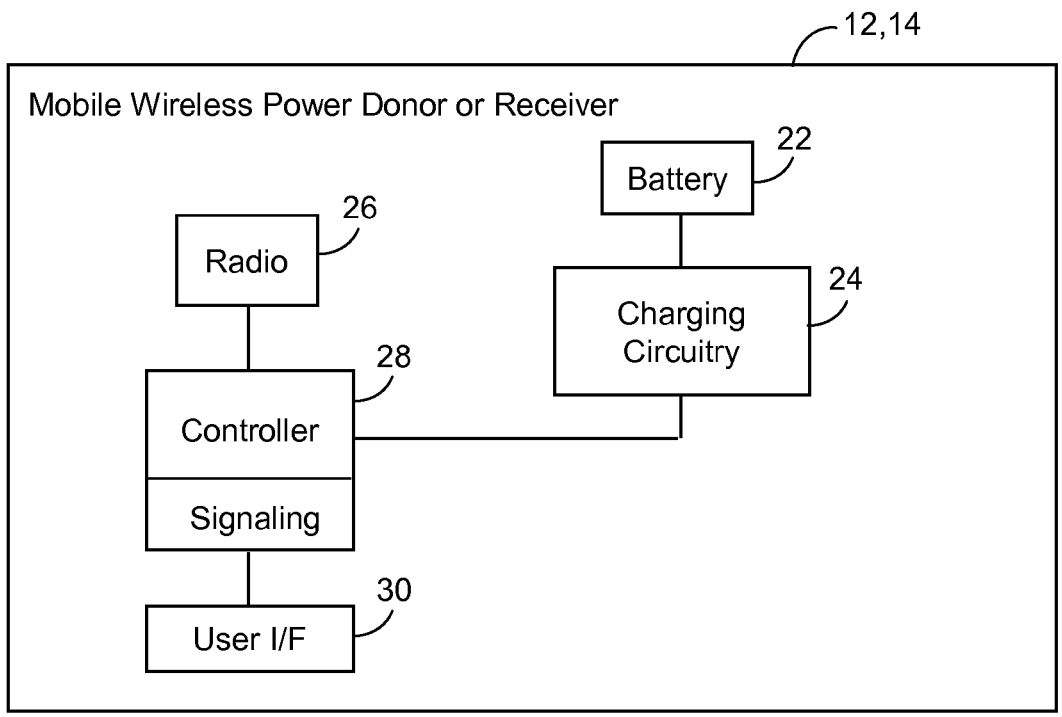
FIG. 6 is a function block diagram for a non-limiting example mobile wireless power donor and/or receiver.

FIG. 6 is a function block diagram for a non-limiting example radio node such as a mobile wireless power donor 12 and/or a radio receiver 14. A battery 22 provides power to the device and is coupled to charging circuitry 24 that permits wireless battery charging. Charging circuitry 24 may also include conventional wire-based/plug-in type charging if desired. The charging circuitry 24 is coupled to a controller 28 which controls the operation of the radio node and various elements therein including the charging circuitry 24, radio circuitry 26, and user interface 30. The controller 28 also generates and/or processes the signaling messages needed for initiating, registering, negotiating, and/or performing wireless charging as described above depending on the type of node.

Figure 7:
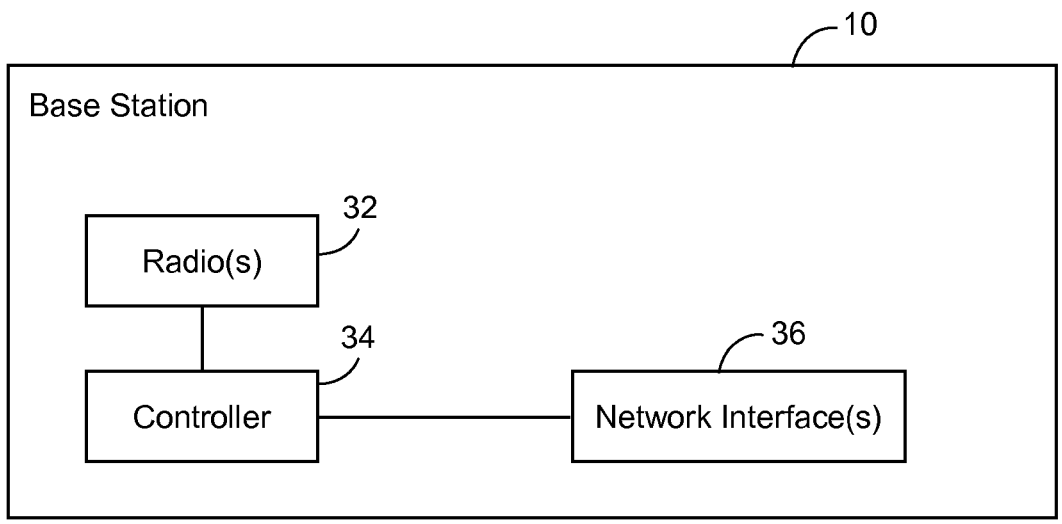
FIG. 7 is a function block diagram for a non-limiting example base station in accordance with the first embodiment.

FIG. 7 is a function block diagram for a non-limiting example base station 10 in accordance with the first example embodiment. The base station includes radio circuitry 32 coupled to a controller 34 that controls the overall operation of the base station 10. The controller is coupled to one or more interfaces 36 for communicating with other network nodes like an HLR and/or other subscriber and service databases, a billing server, etc. The messages shown in FIG. 1 between the base station 10 and the radio nodes 12 and 14 are generated or processed by the controller 34.

The wireless charging technology may or may not direct the charging energy to a specific battery-operated device. For undirected wireless charging, if payment is not reserved for the requesting radio, then the donor UE will not be activated to perform wireless charging, even if the requesting radio is physically very close to the donor UE. If more than one requesting radio requests wireless charging from the same donor UE, then wireless charging may be provided by that donor UE to those multiple radio assuming payment has been reserved and the donor UE has sufficient charging capacity to meet the requests. With directed charging, the donor UE's energy is channeled to one or more specific devices rather than broadcast.

Another concern relates to a "silent" battery-operated radio that detects a wireless charging signal, transmitted in response to another authorized radio's request, and uses it without authorization or payment for charging. One approach to handling this concern is to measure sent power by the donor UE and received power by the authorized and paying receiving radio. These measurements are then associated in some suitable way to the reserved payment. If there is a significant discrepancy between the measurements of donated power and received power, the wireless charging service may be terminated since there is a possibility that some other radio is using the charging power. This approach requires some accommodation for losses inherent in the transfer of power. Another approach might be for the donor UE to send a probe to the requesting radio using the wireless power transfer technology. The requesting radio acknowledges receipt of the probe, and thereafter, the actual wireless charging begins. Such a probe may be used together with the first approach if desired.

There are many advantages with this technology. For example, battery charging may be performed virtually anywhere and at any time—conveniently and quickly. From an operator perspective, this wireless charging service will serve as a platform for other new services. The operator can act as a trusted party for the UEs, facilitating the exchange of resources, e.g., power versus money or the like.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method in a base station to support wireless charging, characterized by:
    the base station receiving a request from a requesting battery-operated radio equipment for wireless charging;
    receiving, at the base station, messages from multiple donor mobile radio nodes indicating each multiple donor mobile radio nodes possesses an ability to provide wireless charging for the battery-operated radio equipment;
    registering, at the base station, the multiple donor mobile radio nodes, wherein registration authorizes the base station to trigger a wireless charging operation whereby any of the multiple donor mobile radio nodes wirelessly charges a proximate end user radio equipment as directed by the base station, wherein the requesting-battery operated radio equipment and the multiple donor mobile radio nodes each comprises a transceiver for communicating with the base station and each comprises wireless charging circuitry;
    responsive to the registering, selecting, at the base station, one or more of multiple donor mobile radio nodes to provide the requested wireless charging to the requesting battery-operated radio equipment;
    authorizing, at the base station, the request to wirelessly charge the battery-operated radio equipment using power from a registered one of the multiple donor mobile radio nodes;
    in response to authorization of the request, the base station arranging wireless charging for the requesting battery-operated radio equipment by the one or more multiple donor mobile radio nodes, which occurs using the wireless charging circuitry of the battery-operated radio equipment and the one of the multiple donor mobile radio nodes; and
    after providing the wireless charging to the requesting battery-operated radio equipment, the one of the multiple donor mobile radio nodes conveying a message to the base station indicating a remaining amount of power available for future charging requests.

2. The wireless charging method in claim 1, wherein the authorizing includes reserving payment from or on behalf of the requesting battery-operated radio equipment for the wireless charging.

3. The wireless charging method of claim 1, further comprising after the wireless charging is provided by the one or more donor mobile radio nodes, initiating payment to or for the benefit of the one or more donor mobile radio nodes for the provided wireless charging.

4. A method in a donor node to provide wireless charging, comprising:
    the donor node conveying a message to a base station indicating an ability and an availability to provide a wireless battery charging service to a requesting battery-operated radio equipment, wherein the donor node and the requesting-battery operated radio equipment each comprises a transceiver for communicating with the base station and each comprises wireless charging circuitry, wherein responsive to the message, the donor node is registered at the base station, wherein registration authorizes the base station to trigger a wireless charging operation whereby the donor node wirelessly charges a proximate end user radio equipment as directed by the base station;
    detecting a charging request associated with a requesting battery-operated radio equipment;
    in response to the charging request, the donor node providing wireless charging to the requesting battery-operated radio equipment using the wireless charging circuitry, the wireless charging arranged by the base station; and
    after providing the wireless charging to the requesting battery-operated radio equipment, the donor node conveying a message to the base station indicating a remaining amount of power available for future charging requests.

5. The wireless charging method in claim 4, further comprising:
    sending a registration message to a radio network to indicate availability to provide the battery charging service.

6. The wireless charging method in claim 5, wherein the registration message includes a charging amount or volume that the donor node can supply for the battery charging service.

7. The wireless charging method in claim 4, wherein the wireless charging is performed using one or more of the following: induction charging, resonance charging, or radio technology.

8. The wireless charging method in claim 4, further comprising the donor node detecting the charging request from a base station.

9. The wireless charging method in claim 4, further comprising the donor node detecting the charging request directly from the requesting battery-operated radio equipment.

10. The wireless charging method in claim 4, further comprising the donor node reserving payment from or on behalf of the requesting battery-operated radio equipment for the wireless charging.

11. A method in a battery-operated radio equipment for receiving wireless charging, comprising:

the battery-operated radio equipment, comprising a transceiver for communicating with a base station and wireless charging circuitry, transmitting a radio message to a base station requesting wireless charging of its battery, wherein the base station registers multiple donor mobile radio nodes, each of the multiple donor mobile radio nodes comprising a transceiver for communicating with a base station and wireless charging circuitry, wherein registration authorizes the base station to trigger a wireless charging operation whereby any of the multiple donor mobile radio nodes wirelessly charges a proximate the battery-operated radio equipment as directed by the base station;

receiving a response to the transmitted radio message from the base station and providing authorization information associated with provision of the wireless charging by one of the registered multiple donor mobile radio nodes proximate to the battery-operated radio equipment, wherein the authorization requires accessing a subscriber database to determine whether or not the battery-operated radio equipment is able to receive the wireless charging from a base station selected one of the registered multiple donor mobile radio nodes;

responsive to authorization from the base station provided in the response, receiving, at the battery-operated radio equipment, a wireless charging signal from the base station selected one of the multiple donor mobile radio nodes; and using the received wireless charging signal to charge the battery of the battery-operated radio equipment, wherein after the wireless charging of the battery-operated radio equipment occurs, the base station receives an update indicating a remaining amount of power available from the base station selected one of the multiple donor mobile radio nodes for future charging requests.

12. The wireless charging method in claim 11, wherein the authorization includes providing for payment for the requested wireless charging on behalf of the donor mobile radio.

13. The wireless charging method in claim 11, wherein the battery-operated radio equipment broadcasts the radio message requesting wireless charging of its battery for receipt by one or more donor mobile radio nodes.

14. A base station for facilitating wireless charging battery-operated radio equipment, comprising:

radio circuitry configured to receive a request from a requesting battery-operated radio equipment for wireless charging and configured to receive, at the base station, messages from multiple donor mobile radio nodes indicating each of the multiple donor mobile radio nodes possesses an ability to provide wireless charging for the battery-operated radio equipment;

circuitry configured to register, at the base station, the multiple donor mobile radio nodes, wherein registration authorizes the base station to trigger a wireless charging operation whereby any of the multiple donor mobile radio nodes wirelessly charges a proximate end user radio equipment as directed by the base station, wherein the requesting-battery operated radio equipment and the multiple donor mobile radio nodes each comprises a transceiver for communicating with the base station and each comprises wireless charging circuitry, and control circuitry coupled to the radio circuitry, configured to: select, at the base station, one or more of the multiple donor mobile radio nodes to provide the requested wireless charging to the requesting battery-operated radio equipment, authorize the request, and in response to authorization of the request, arrange wireless charging for the requesting battery-operated radio equipment by the one or more multiple donor mobile radio nodes, wherein the radio circuitry after the one or more multiple donor mobile radio nodes provides the wireless charging to the requesting battery-operated radio equipment, receives a message from the one or more multiple donor mobile radio nodes indicating a remaining amount of power available for future charging requests.

15. The base station in claim 14, wherein the authorization includes reserving payment from or on behalf of the requesting battery-operated radio equipment for the wireless charging.

16. The base station in claim 14, wherein the control circuitry is configured to initiate payment to or for the benefit of the one or more donor mobile radio nodes for the provided wireless charging after the wireless charging is provided by the one or more donor mobile radio nodes.

17. The base station in claim 14, wherein the control circuitry is configured to:

receive requests from the multiple donor mobile radio nodes indicating an ability to provide wireless charging for battery-operated radio equipment, and register the multiple donor mobile radio nodes.

18. A donor mobile radio node for providing wireless charging, comprising:

radio circuitry configured to detect a charging request from a base station associated with a requesting battery-operated radio equipment, said radio circuitry being configured to send a message indicating the donor mobile radio nodes possesses an ability to provide wireless charging for the battery-operated radio equipment, whereby the base station registers the donor mobile radio node along with a plurality of other potential donor mobile radio nodes, wherein registration authorizes the base station to trigger a wireless charging operation whereby any of the donor mobile radio nodes including said donor mobile radio node wirelessly charges a proximate end user radio equipment as directed by the base station;

wireless charging circuitry configured to provide wireless charging to the requesting battery-operated radio equipment, the wireless charging arranged by the base station to support wireless charging of the battery-operated radio equipment; and control circuitry configured to generate a message for transmission by the radio circuitry indicating availability of the donor mobile radio node to provide a battery charging service in response to the charging request by the base station, wherein said control circuitry is further configured to after providing the wireless charging to the requesting battery-operated radio equipment, conveying a message to the base station indicating a remaining amount of power available from the donor mobile radio node for future charging requests.

19. The donor mobile radio node in claim 18, wherein the control circuitry is further configured to generate a registration message for transmission by the radio circuitry to a radio network node indicating availability to provide the battery charging service.

20. The donor mobile radio node in claim 18, wherein the wireless charging circuitry includes one or more of inductive charging circuitry, resonance charging circuitry, or radio charging circuitry.

21. The donor mobile radio node in claim 18, wherein the radio circuitry is configured to detect the charging request from a base station or directly from the requesting battery-operated radio equipment.

22. A battery-operated radio equipment for requesting wireless charging, comprising:
- a battery;
- a radio transceiver;
- control circuitry; and
- wireless charging circuitry,
- wherein the radio transceiver is characterized by being configured to transmit a radio message to a base station requesting wireless charging of its battery, wherein the base station registers multiple donor mobile radio nodes, each of the multiple donor mobile radio nodes comprising a transceiver for communicating with a base station and wireless charging circuitry, wherein registration authorizes the base station to trigger a wireless charging operation whereby any of the multiple donor mobile radio nodes wirelessly charges the battery-operated radio equipment as directed by the base station,
- the control circuitry is characterized by being configured to receive a response to the transmitted radio message from the base station providing authorization information associated with provision of the wireless charging by one of the registered multiple donor mobile radio nodes proximate to the battery-operated radio equipment, wherein the authorization requires accessing a subscriber database to determine whether or not the battery-operated radio equipment can receive the wireless charging from a base station selected one of the registered multiple donor mobile radios, and
- the wireless charging circuitry is characterized by being configured to, responsive to authorization from the base station provided in the response, use a wireless charging signal received from the base station selected one of the multiple donor mobile radio nodes to charge the battery of the battery-operated radio equipment, wherein after the wireless charging of the battery-operated radio equipment occurs, the base station receives an update indicating a remaining amount of power available from the base station selected one of the multiple donor mobile radio nodes for future charging requests.

23. The battery-operated radio equipment in claim 22, wherein the control circuitry is configured to send a message that provides for payment for the requested wireless charging on behalf of the donor mobile radio node.

24. The battery-operated radio equipment in claim 22, wherein the radio transceiver is configured to broadcast the radio message requesting wireless charging of its battery for direct receipt by one or more donor mobile radio nodes.

* * * * *